July 9, 1940.     S. T. LESTER     2,207,625
MEASURING APPARATUS
Filed Sept. 15, 1937     2 Sheets-Sheet 1
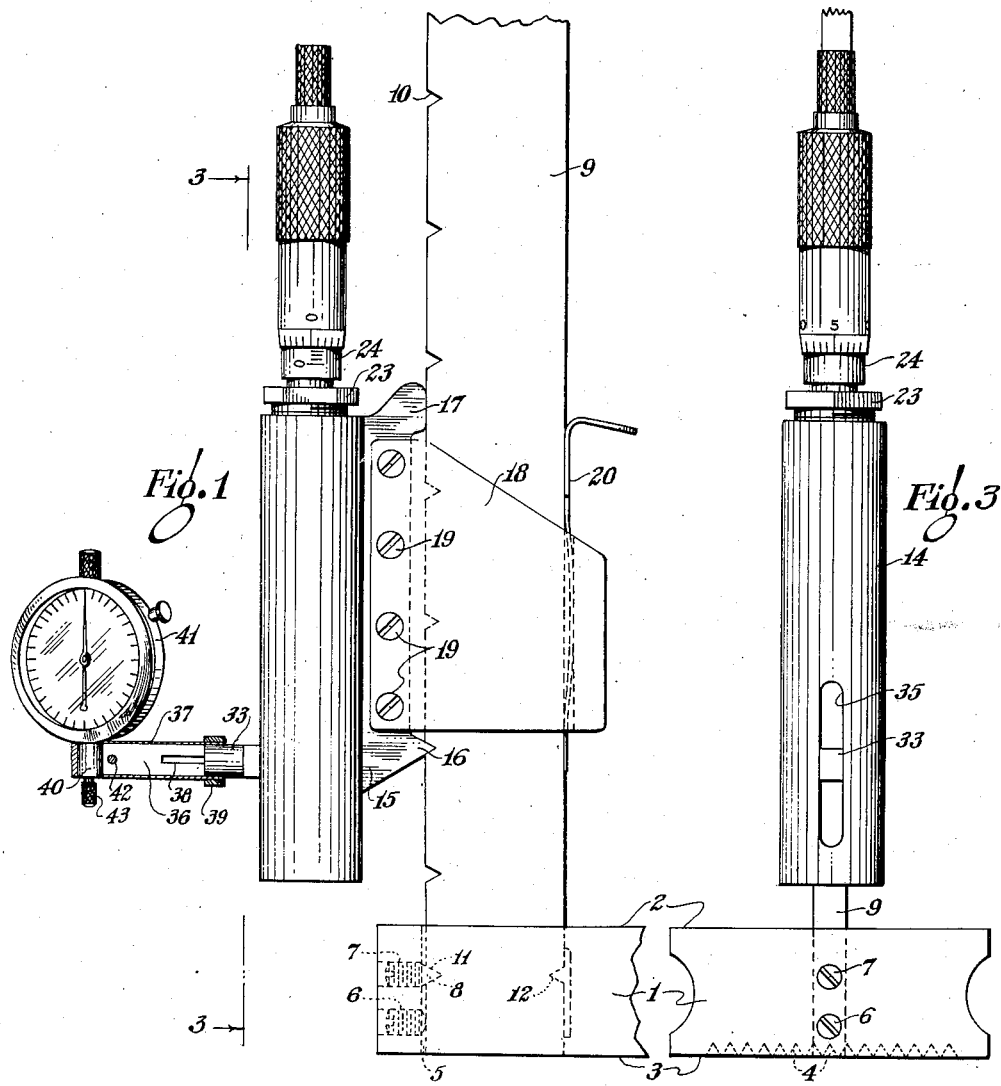
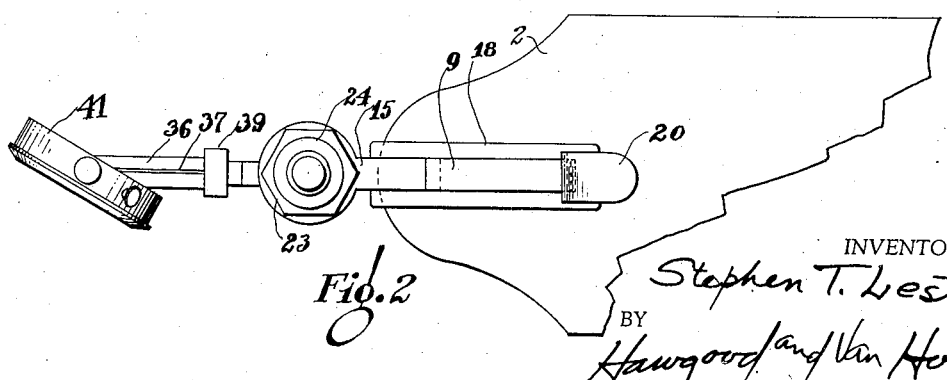
INVENTOR.
Stephen T. Lester
BY Hawgood and Van Horn
ATTORNEYS July 9, 1940.   S. T. LESTER   2,207,625
MEASURING APPARATUS
Filed Sept. 15, 1937   2 Sheets-Sheet 2
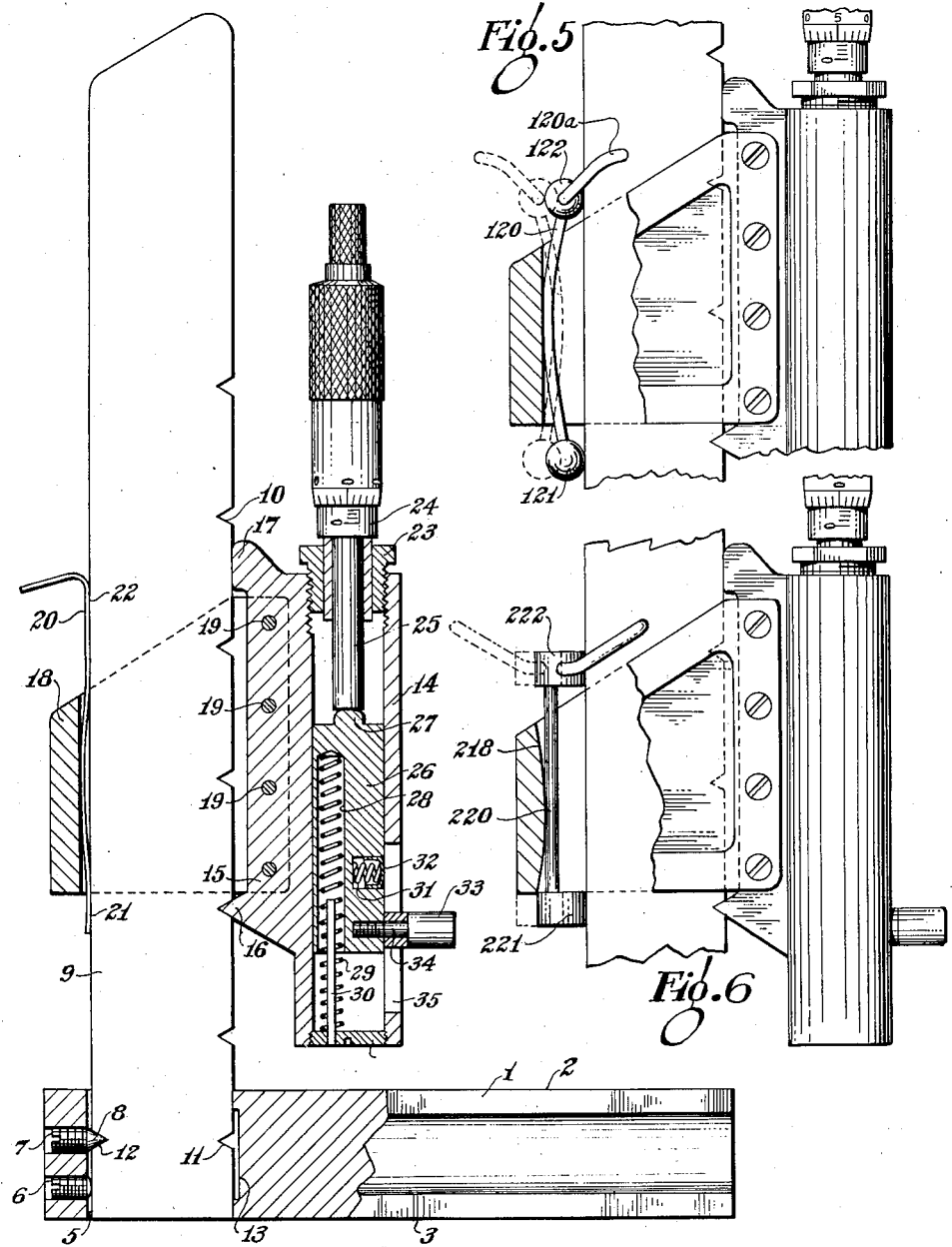
Stephen T. Lester
INVENTOR.
BY Hawgood and Van Horn
ATTORNEYS Patented July 9, 1940

2,207,625

UNITED STATES PATENT OFFICE 2,207,625

MEASURING APPARATUS

Stephen T. Lester, Cleveland Heights, Ohio

Application September 15, 1937, Serial No. 163,951

8 Claims. (Cl. 33—170)

This invention relates to measuring apparatus and more particularly to apparatus which is adapted to the obtaining of accurate measurements over a considerable range of distances, such as often is required in conjunction with machine operations and the like.

An object of the invention is to provide an improved measuring apparatus which may be arranged accurately to measure a large variety of dimensions.

Another object is to provide an improved measuring apparatus which may easily and conveniently be used.

Another object is to provide an improved measuring apparatus which may be readily adjusted throughout a relatively large range of distances.

Another object is to provide an improved measuring apparatus which may be adjusted in such manner that possibility of distortion will be substantially precluded.

Another object is to provide an improved measuring apparatus which may be adjusted to several readings and accurately returned to any preceding reading at will.

Another object is to provide an improved measuring apparatus which will be simple and rugged in construction.

Another object is to provide an improved measuring apparatus which may be readily and economically manufactured.

Another object is to provide an improved measuring apparatus in which the parts will be subjected only to predetermined and non-distorting forces.

Other objects will hereinafter appear.

The invention will be better understood from the description of several practical embodiments thereof, illustrated in the accompanying drawings, in which:

Figure 1 is a fragmentary side elevational view of a height gage constituting one embodiment of the invention;

Figure 2 is a fragmentary plan view thereof;

Figure 3 is the front elevational view of the apparatus of Figures 1 and 2;

Figure 4 is a fragmentary sectional view of the parts shown in the preceding figures, arranged in different positions; and Figures 5 and 6 are fragmentary elevational views, parts being shown in section, of two modified forms of pressure applying means.

The inventions of this application constitute, in part, improvements on the inventions disclosed in my previous patent No. 1,949,280, issued February 27, 1934.

While the apparatus of this patent has been found very satisfactory in practice, and as will be apparent from the succeeding description, certain principles disclosed therein are incorporated in the apparatus illustrated herein, I find that some types can advantageously be modified, particularly to the end of further reducing any personal element entering into the setting of the device, as will hereinafter be more fully pointed out.

Also some modifications may be made adapting the apparatus to slightly different uses and to more facile manipulation.

The apparatus illustrated in the first four figures is shown as including a base, indicated generally at 1, having accurately finished parallel planes top and bottom surfaces 2 and 3 respectively, which are spaced apart by a known amount, preferably an even unit or a plurality of even units.

The lower surface of the base is shown as having a series of parallel grooves 4 which reduce the area of the plain lower surface and contribute the ease of accuracy forming this surface, as well as constituting a means for scraping or picking up dirt particles upon the surface on which rests the base, and thus precluding such particles from interfering with the accuracy of measurements above the supporting surface.

The base has extending therethrough a rectangular slot 5, which may be either formed into a base made of a single piece of metal, or may be produced by milling a slot in the end of the main part of the base and welding to it, over the end of the slot, another part spanning this.

In alignment with the slot are two tapped holes, in one of which is threaded a blunt set screw 6 and in the other set screw 7 having a tapered or pointed end, as indicated at 8, for the purpose of locating the carrier beam or blade 9 as will be pointed out hereinafter.

The beam or blade consists of a flat bar of a type of steel not seriously effected by temperature changes or other forces, which is provided along one edge with a series of V-shaped notches 10 arranged to locate the instrument carrier in a plurality of positions.

These notches are preferably spaced apart by distances which are exact units of measurement, or an even fraction or multiple of such units, and it will be readily understood that in ordinary measurements to be made in feet and inches, spacing by complete inches will be probably most convenient, although one-half, quarter inch, or other fractions of an inch might well be used, and that the spacing will depend mainly upon the type of apparatus used for adjustment.

The carrier-engaging notches 10 are located with respect to the upper and lower surfaces of the base by means of a blade locating notch 11 formed in the portion in the end of the blade which is received within the slot in the base, and which may be engaged by the tapered end 8 of the locating set screw.

A similar notch 12 in alinement therewith is formed on the opposite edge of the blade, so that the blade may be removed from the slot in the base and re-inserted and adjusted in position facing in the opposite direction, that is, it may be arranged with the notches, as shown in the first figures of the drawings, to the left, where the carrier extends beyond the base, and in which position the apparatus is most useful for measuring distances from the bottom surface of the base, or the blade when reversed may be positioned so that the notches will be to the right above the base, as shown in Figure 4, the carrier then being above the upper surface 2 of the base and adapted to measure most conveniently distances from this upper surface.

When in either position, the blade is accurately located and clamped by tightening the two set screws 6 and 7, one of which vertically locates the notch and blade, and the other of which serves to tightly clamp the blade against the opposite side of the slot 5.

To prevent particles of dirt and the like getting between the slot surface and the blade, the base may slightly be recessed as indicated at 13, so that it engages the blade only at spaced points.

The instrument carrier consists of a vertical barrel 14 shown as formed integrally with a blade engaging rib 15 having formed upon it two projections for engaging the blade.

One of these projections 16 is tapered or V-shaped and adapted to enter the notches in the blade, while the other 17 has a flat surface to engage the edge of the blade between successive notches and at substantial distance from the first mentioned projection.

A channel-shaped stirrup 18 is secured to the barrel rib as by screws 19 and completely surrounds the blade. Between the end web of this stirrup and the unnotched edge of the blade, a small leaf spring 20 may be inserted, this spring bearing upon the blade at two points 21 and 22 substantially in alinement with the projections 16 and 17 of the barrel rib, and intermediate these points against the web.

This spring tightly clamps the projections, respectively, into the notch and against the edge of the carrier blade with a predetermined amount of pressure. Inasmuch as this pressure is determined by the spring, and cannot be varied by the operator, and inasmuch as this pressure places two transverse bands of the blade only in compression, it has no tendency to spring, bend, or otherwise distort the blade, and so accurately locates the barrel at all times with respect thereto.

Threaded in the upper end of the barrel is a bushing 23 in which is clamped a micrometer head 24 shown as of generally conventional design, the shank 25 of the micrometer head extending into the barrel and substantially coaxial therewith.

The interior of the barrel is of accurately formed cylindrical shape and enclosed within it and accurately fitting this surface is a generally cylindrical plunger 26 provided at its upper end with a contact 27 to be engaged by the micrometer shank.

The plunger is provided with a longitudinally extending recess 28 in which is mounted a helical compression spring 29 maintaining the plunger tightly against the lower end of the micrometer shank. The lower end of this spring is located by means of a pin 30 having an eccentric head or plug threaded into the lower end of the barrel.

To further increase the accuracy of the device, and to cause the plunger to remain at all times against the inner side of the barrel, the plunger has been provided with a radial recess in which is received a small compression spring 31 and bearing shoe 32 which press against the outer side of the barrel wall to urge the plunger toward the inner side thereof.

A radially extending pillar 33 is secured to the plunger by a threaded portion 34 and extends through a slot 35 cut in the outer barrel wall. The slot and cover act as a key-way and key, preventing any rotation of the plunger in the barrel.

Upon the pillar is mounted a measuring instrument, such as a dial indicator, which may be of a type fastened directly to the pillar by means of a screw and the like or, as illustrated, may be mounted in the end of a tubular arm 36, shown as slotted at 37 along a generally vertical plane and at 38 along a horizontal plane. A nut 39 engaging a tapered thread at the end of the arm clamps the four segments thereof tightly upon the pillar 33.

A tubular extension 40 of a dial indicator 41 extends through the end of the arm, which is clamped about the extension by screw 42, the shank 43 of the indicator extending beyond the arm to contact articles to be measured.

It will thus be seen that, by movement of the instrument carrier upon the blade, adjustments may be made in the distance measured by the indicator in accordance with the distance between successive notches, and that further adjustments intermediate the several notches may be made by adjusting the micrometer head in the ordinary manner in which such instrument is adjusted, which directly moves the plunger and the indicator carried thereby.

Thus, for instance, with a one inch micrometer head and notches spaced an inch apart, the plunger may be accurately adjusted anywhere throughout the distance determined by the notched portion of the blade, and the accuracy of adjustment may be rendered fully as accurate as the setting of any micrometer.

This will be so whether the mircrometer head be calibrated in ten-thousandths of an inch or other units, and similarly, accuracy may be obtained with a blade notched in centimeters and a micrometer head of the metric type, and in both instances still further accuracy of measurement may be obtained through the indicator mechanism mounted upon the pillar of the plunger.

In the embodiment of the invention illustrated in Figure 5 the unitary leaf spring has been replaced by a round bar 120 of spring metal, provided on its ends with contacting projections 121 and 122 and with an operating handle 120a.

The spring bar is bent as indicated and may be rotated from the position shown in solid lines to that shown in dotted lines, in the former of which it will be apparent that the offset ends press the contacting projections against the smooth edge of the blade, producing a clamping action like that of the spring of the first two figures, and that when rotated into the dotted line position these ends are retracted from the smooth edge of the blade and permit easy adjustment of the instrument carrier thereon.

Obviously, a straight bar 220 might be used and eccentrically mounted contacting elements 221 and 222 at the ends thereof moved toward and from the blade end, as indicated in Figure 6.

In this form, provision is made for the flexing of spring 220 by the curved surface 218 of the stirrup web.

While I have described the illustrated embodiments of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. Measuring apparatus comprising a beam having an edge provided with a series of notches, a carrier movable along said beam and having two rigidly attached projections arranged to contact said edge, one projection selectively engaging the notches and the other engaging the edge intermediate successive notches, and resilient clamping means interposed between the beam and carrier and engaging the opposite edge of said beam at spaced points substantially opposite said projections, a slide movably carried by said carrier, and measuring apparatus carried by said slide.

2. Measuring apparatus comprising a beam having an edge provided with a series of notches, a carrier movable along said beam and having two rigidly attached projections arranged to contact said edge, one projection selectively engaging the notches and the other engaging the edge intermediate successive notches, and resilient clamping means interposed between the beam and the carrier engaging the opposite edge of said beam at spaced points substantially opposite said projections, a slide movably carried by said carrier, resilient means on the carrier for moving the slide in one direction, adjusting means on the carrier for moving the slide in the other direction, and measuring means carried by said slide.

3. Measuring apparatus comprising a carrier, a plunger slidably carried thereby, a spring carried by the carrier and interposed between it and the plunger whereby the spring urges the plunger in one direction, measuring means carried by the carrier and contacting the plunger and adjustably urging it in the opposite direction whereby the spring maintains the plunger always in contact with the measuring means so that the position of the plunger is at all times correlated to the adjustment of the measuring means, and measuring apparatus carried by said plunger.

4. Measuring apparatus comprising a carrier, a plunger slidably carried thereby, a spring carried by the carrier and interposed between it and the plunger whereby the spring urges the plunger in one direction, a micrometer head carried by the carrier and contacting the plunger and adjustably urging it in the opposite direction whereby the spring maintains the plunger always in contact with the micrometer head so that the position of the plunger is at all times correlated to the adjustment of the micrometer head, and an indicator carried by said plunger.

5. Measuring apparatus comprising a carrier, a guide thereon, a plunger slidably carried thereby, a spring carried by the carrier and bearing thereon to adjustably urge the plunger in one direction, measuring means carried by said carrier and contacting the plunger and urging it in the opposite direction whereby the spring maintains the plunger always in contact with the measuring means so that the position of the plunger is at all times correlated to the adjustment of the measuring means, resilient means on said carrier pressing said plunger against its guide, and measuring apparatus carried by said plunger.

6. Measuring apparatus comprising a carrier, a guide thereon, a plunger slidably carried thereby, a spring carried by the carrier and bearing thereon to adjustably urge the plunger in one direction, a micrometer head carried by said carrier and contacting the plunger and urging it in the opposite direction whereby the spring maintains the plunger always in contact with the micrometer head so that the position of the plunger is at all times correlated to the adjustment of the micrometer head, resilient means on said carrier pressing said plunger against its guide, and an indicator carried by said plunger.

7. Measuring apparatus comprising a carrier, means for mounting the carrier in a known position, a plunger movable within the carrier, measuring means on the carrier contacting one surface of said plunger for moving the same in one direction, and a spring carried by the carrier pressing the plunger toward the measuring means to maintain a substantial pressure between the measuring means and said plunger surface.

8. Measuring apparatus comprising a carrier, means for mounting the carrier in a known position, a plunger movable within the carrier, measuring means on the carrier contacting one surface of said plunger for moving the same in one direction, a spring carried by the carrier pressing the plunger toward the measuring means to maintain a substantial pressure between the measuring means and said plunger surface, and resilient means interposed between the carrier and the plunger maintaining the plunger at all times against a guide surface of the carrier.

STEPHEN T. LESTER.